UNITED STATES PATENT OFFICE.

ALEXANDER JUST AND FRANZ HANAMAN, OF BUDAPEST, AUSTRIA-HUNGARY.

PROCESS OF MANUFACTURING INCANDESCENT BODIES FOR ELECTRIC LAMPS.

No. 878,463.    Specification of Letters Patent.    Patented Feb. 4, 1908.

Original application filed July 6, 1905, Serial No. 268,523. Divided and this application filed January 7, 1907. Serial No. 351,113.

*To all whom it may concern:*

Be it known that we, ALEXANDER JUST, chemist, and FRANZ HANAMAN, chemical engineer, both subjects of the Emperor of Austria-Hungary, residing at Budapest, Desewffy utcza 3, in the Kingdom of Hungary, have jointly invented certain new and useful Improvements in Process of Manufacturing Incandescent Bodies for Electric Lamps, of which the following is a specification.

Our present invention relates more particularly to certain improvements in the method of producing incandescent bodies for electric lamps, in which a carbon filament coated with tungsten is subjected for a certain period to a high temperature, under the influence of an electric current, in an atmosphere of a neutral gas, as hydrogen, to cause the carbon of the core of the filament to combine with the metal to form the carbid, and then removing the carbon of the carbid so as to leave the filament in a coherent dense and homogeneous metallic condition.

This application is a division of an application for United States Letters Patent for the manufacture of incandescent electric lamps filed by us July 6th, 1905, under the Serial No. 268,523.

Heretofore various processes have been availed of, having for their object the application of tungsten to a suitable carrier mostly carbon, for producing an incandescent filament with increased luminous power, but such incandescent bodies so produced did not permit of useful applications because of foreign constituents therein such as carbon, oxygen (as the oxids), or easily fusible metal wire upon which the tungsten was deposited, especially if subjected to heavy strain and were also thrown onto the wall of the bulb or they combined chemically with the tungsten to the detriment of the resultant filament for use.

Our present invention is predicated upon the manufacture of a pure tungsten filament, consisting in the first instance of carbon having a coating of tungsten applied thereto. It is known that carbon filaments can be coated with tungsten by heating the same in the vapors of the halogen compounds of the metal tungsten, in the presence of a substantial amount of hydrogen. Carbon filaments (of about 0.04 mm. in diameter), may be coated with a layer of the metal tungsten of a certain thickness, and if treated then in the following manner a metallic filament is obtained.

If the filaments are exposed in an atmosphere of a suitable neutral gas, such as hydrogen, under the influence of an electric current, at a high temperature, such treatment causes the carbon contained in the core to be dissolved in the metal tungsten. By the dissolution taking place, the free carbon of the core in the form of carbid is absorbed. A filament so treated is found to be coherent dense and homogeneous and no longer contains a carbon core.

The filament is freed from the carbon by a chemical method, that is, the carbon contained in the form of carbid in the filament is removed in an analogous manner as carbon contained in a mechanical mixture of tungsten and carbon are removed from each other. For this purpose the filament is suitably exposed to an atmosphere of hydrogen, in the presence of a small quantity of steam, under the influence of an electric current, at a high temperature, whereby the carbon present in the form of carbid, is completely oxidized to CO. The changes of resistance of the filament by this treatment makes it apparent that an effective decarbonization has actually taken place.

The electrical resistance of such a filament, as long as it contains carbid-carbon, is considerably higher than the resistance of a metal filament. Whether the removing of the carbon be complete or whether there is still some residue of carbid in the filament can be best ascertained by simply measuring the resistance of the filament during the operation.

Having thus described the nature and objects of our invention what we claim as new and desire to secure by Letters Patent is:—

1. The method of producing an incandescent body for electric lamps, which consists in subjecting a carbon body coated with tungsten for a certain period to a high temperature under the influence of an electric current in an atmosphere of a neutral gas to cause the carbon core to be dissolved in the metal forming a carbid thereby, and then removing the carbon from the carbid thus produced, substantially as and for the purposes described.

2. The method of producing an incandescent body for electric lamps, which consists in subjecting a carbon body coated with tungsten for a certain period to a high temperature under the influence of an electric current in an atmosphere of a neutral gas to cause the carbon core to be dissolved in the metal forming a carbid thereby and then removing, chemically, the carbon of the carbid thus produced, substantially as and for the purpose described.

In testimony whereof we have signed our names to this specification in the presence of two subscribing witnesses.

ALEXANDER JUST.
FRANZ HANAMAN.

Witnesses:
LÁBON HAJON,
CHARLES E. ZALUN.